US007505430B2

(12) United States Patent
Merkle et al.

(10) Patent No.: US 7,505,430 B2
(45) Date of Patent: *Mar. 17, 2009

(54) ALTERNATIVE FREQUENCY STRATEGY FOR DRM

(75) Inventors: Carsten Merkle, Welzheim (DE); Jens Wildhagen, Weinstadt (DE); Markus Zumkeller, Schwaikheim (DE)

(73) Assignee: Sony Deutschland GmbH, Cologne (DE)

( * ) Notice: Subject to any disclaimer, the term of this patent is extended or adjusted under 35 U.S.C. 154(b) by 874 days.

This patent is subject to a terminal disclaimer.

(21) Appl. No.: 10/914,524

(22) Filed: Aug. 9, 2004

(65) Prior Publication Data

US 2005/0008034 A1 Jan. 13, 2005

Related U.S. Application Data

(62) Division of application No. 09/565,246, filed on May 5, 2000, now Pat. No. 7,224,675.

(30) Foreign Application Priority Data

May 7, 1999 (EP) .................................. 99109102
Dec. 30, 1999 (EP) .................................. 99126215

(51) Int. Cl.
*H04Q 7/00* (2006.01)

(52) U.S. Cl. ........................ 370/329; 370/390; 370/473; 370/477; 455/59

(58) Field of Classification Search .................... 455/59
See application file for complete search history.

(56) References Cited

U.S. PATENT DOCUMENTS 5,222,076 A * 6/1993 Ng et al. ..................... 375/223

(Continued)

FOREIGN PATENT DOCUMENTS

EP 0 689 307 12/1995

(Continued)

OTHER PUBLICATIONS

"DAB-Empfangstechnik" Funkschau, vol. 67, No. 11, May 12, 1995, pp. 36-39, XP000517147.

*Primary Examiner*—Chi H. Pham
*Assistant Examiner*—Shick Hom
(74) *Attorney, Agent, or Firm*—Oblon, Spivak, McClelland, Maier & Neustadt, P.C.

(57) ABSTRACT

A radio transmission signal consisting of signal frames that comprise a dynamic data part and a quasi-static data part according to the present invention is characterized in that the dynamic data part of a respective frame contains an indicator showing in which following frame the quasi-static data part of this respective frame will be repeated. Therewith, an alternative frequency of e.g. a digital shortwave signal like a DRM signal can easily and satisfactorily be checked before a fast seamless switching to this alternative frequency can be performed. The inventive method to perform a seamless switching of a receiver from a first currently tuned frequency to a second alternative frequency is characterized by the step of receiving at least one set of samples from a respective signal transmitted on at least one second frequency during a time period during which said indicator assures that it is secure that only data that has been transmitted at least once is transmitted as signal on said first frequency to gather some information about said alternative frequency.

16 Claims, 12 Drawing Sheets

U.S. PATENT DOCUMENTS

| | | | | |
|---|---|---|---|---|
| 5,809,009 | A * | 9/1998 | Matsuoka et al. | 370/206 |
| 6,005,889 | A * | 12/1999 | Chung et al. | 375/140 |
| 7,224,675 | B1 * | 5/2007 | Merkle et al. | 370/330 |

FOREIGN PATENT DOCUMENTS

| | | |
|---|---|---|
| GB | 2 247 121 | 2/1992 |

* cited by examiner

ALTERNATIVE FREQUENCY STRATEGY FOR DRM

CROSS REFERENCE TO RELATED APPLICATION

This application is a division of application Ser. No. 09/565,246, filed May 5, 2000 now U.S. Pat. No. 7,224,675.

The invention relates to a radio transmission signal consisting of signal frames that comprise a dynamic data part and a quasi-static data part as well as to a method to perform a seamless switching of a receiver for such radio transmission signals from a first currently tuned frequency to a second alternative frequency (AF).

In broadcast systems that deliver the same services in adjacent or overlapping areas on different frequencies, it is needed to find a proper criteria to switch to an alternative frequency without loosing the service, i.e. to perform a seamless switching.

In public information service systems like DAB or DVB-T techniques for switching to alternative frequency are used, but they provide no disturbance-free switching from one frequency to another. In the EP-A-98 119 400 a method and data frame structure for the digital transmission of information is suggested in which the transmission system is defined such that the receiver is able to test an alternative frequency without loosing any relevant information on the current tuned frequency, because the signal in the air consists of two parts, namely a continuous data-channel like audio with interleaving in time, but not repeated, and a static data channel including information about the service, multiplex configuration, program time, transmitter ID, service ID and alternative frequency list. In this system the receiver has the time to check alternative frequencies without loosing relevant information data during the static data-channel.

However, this transmission system underlies the condition that the static data-channel is identical and unique for all services at all times, i.e. the same static data-channel is transmitted by all transmitters belonging to a service without any changes at any time. For a certain radio transmission systems, e.g. DRM (Digital Radio Mondial), no such reliable static data-channel is, provided and therefore it cannot be secured that in such radio transmission systems a seamless switching will be performed in any instance.

It is the object of the present invention to provide a disturbance-free switching between various transmitters delivering the same services in adjacent or over-lapping areas on different frequencies also for radio transmission systems that do not provide a static data-channel, but only a quasi-static data-channel that comprises in general only static data, but allows also changes of this static data.

This object is solved on basis of a radio transmission signal consisting of signal frames that comprise a dynamic data part and a quasi-static data part as defined in independent claim 1 which is characterized in that the dynamic data part of a respective frame contains an indicator showing in which following frame the quasi-static data part of this respective frame will be repeated.

Preferred embodiments of such a radio transmission signal are defined in dependent claims 2 to 6.

Based on such a radio transmission signal a method to perform a seamless switching from a first currently tuned frequency to a second alternative frequency is defined in independent claim 7 by the step of receiving at least one set of samples from a respective signal transmitted on at least one second frequency during a time period during which said indicator assures that it is secure that only data that has been transmitted at least once is transmitted as signal on said first frequency.

Preferred embodiments of this method are defined in dependent claims 8 to 14.

A receiver according to the present invention is defined in claim 15. Preferred embodiments thereof are shown in dependent claims 16 to 19.

According to the present invention seamless switching between alternative frequencies is allowed without loosing any data, since it is secure to check different alternative frequencies or to switch to an alternative frequency without loosing any data during a repetitive part which is identified on basis of an indicator in the dynamic data part of a transmission signal. Preferably, a radio transmission signal according to the present invention consists of a quasi-static data-channel (SD), a dynamic data-channel (DD) and a gap-channel (GAP). The signal is then formed of consecutive frames each of which consists of a gap part, a quasi-static data part and a dynamic data part. In this case, a respective indicator within a respective dynamic data part about the quasi-static data part relates also to a forthcoming gap part transmitted in the same signal frame as the symbol(s) of the quasi-static data part the respective indicator relates to.

An advantageous structure within the dynamic data-channel is to provide said indicators together with a frame counter so that an easy indication in which following frame the same symbol(s) will be transmitted in the quasi-static data-channel and eventually the gap can easily be assured.

The content of the gap-channel and quasi-static data-channel is e.g. the alternative frequency list with geographical references and the multiplex information, information about the service, program type, transmitter ID and service ID which might change from time to time, e.g. in case a certain alternative frequency is switched to another service or the program type of a frequency changes.

The invention and the underlying concept will be described in the following with reference to the accompanying drawings, in which FIG. 1 depicts the principle frame structure and partly the preferred contents of information units according to a first preferred embodiment of the invention;

FIG. 2 elucidates the basic frame structure of a signal with its delayed version on an alternative frequency;

FIG. 3 elucidates the basic frame structure of a signal with its early version on an alternative frequency;

FIG. 4 shows the correlation result of two probes of the signal transmitter on an alternative frequency with a reference signal generated within the receiver;

FIG. 5 explains the maximum delay of an alternative frequency in respect to a currently tuned frequency for the checking of the alternative frequency;

FIG. 6 explains the maximum delay of an alternative frequency in respect to a currently tuned frequency for the checking of the alternative frequency in case the gap part is used as synchronization symbol;

FIG. 7 explains the maximum delay for a seamless switching from a currently tuned frequency to an alternative frequency;

Figure 1:
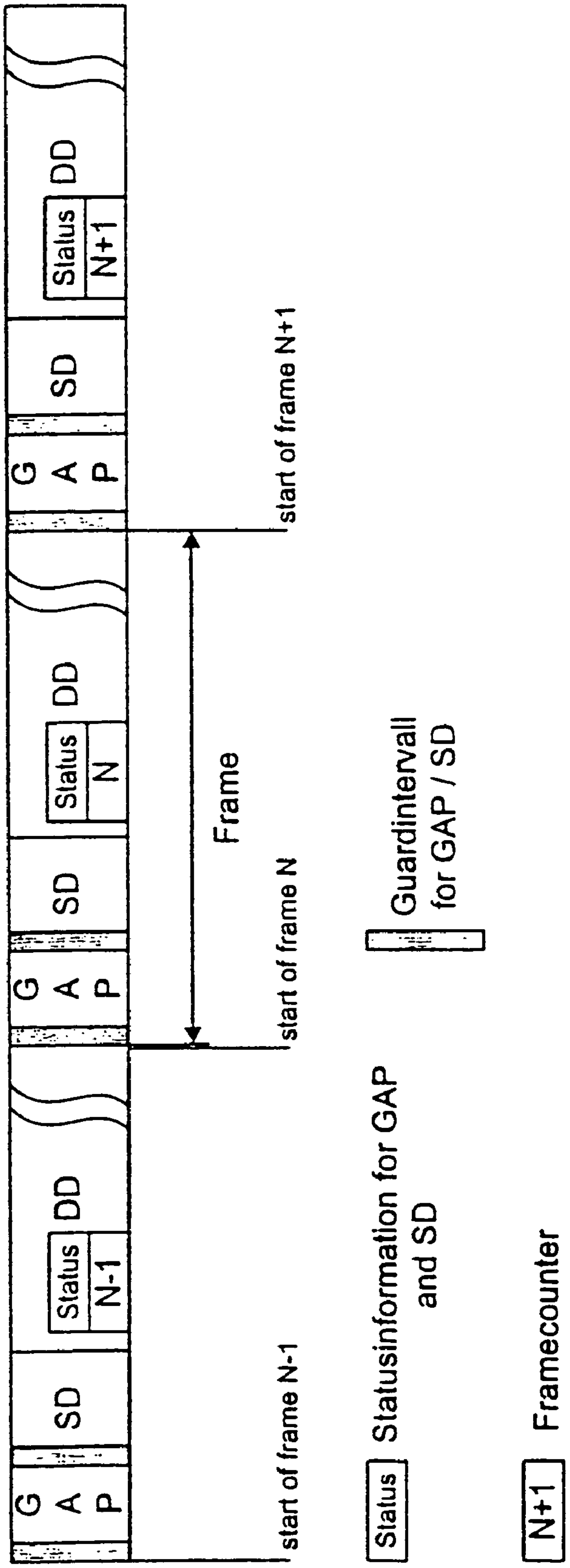

A digital transmission system embodying the invention should have a frame structure as shown in FIG. 1. The signal in the air generally consists of two parts, i.e.

a dynamic data-channel (DD) like an audio-channel with interleaving in time, but not repeated, and a quasi-static data-channel (SD), e.g. comprising the information about the respective service, i.e. multiplex location, program type, alternative frequency list, transmitter ID and as the case may be additional service information.

Additionally, a gap can be located within a frame, as also shown in FIG. 1, which could have a variable length depending on the transmission frequency and therefore on the possible delay between the alternative frequencies. For OFDM stystems the variable lenght of the gap might be realized by reducing the total amount of carries. This gap can either be empty or information transmitted within the quasi-static data-channel can be shifted to the gap.

The quasi-static data-channel and/or the gap might comprise a guardinterval.

According to the present invention, the respective dynamic parts of the dynamic data-channel comprise status information for the respective corresponding quasi-static data parts of the quasi-static data-channel or the quasi-static data-channel and the gap. This status information might show the frame number of the following frame in which the quasi-static data part and if applicable the gap part comprise the identical symbols as the quasi-static data part and if applicable the gap part of the frame comprising the status information. In an advantageous embodiment the dynamic data-channel carries also a frame counter in every dynamic data part indicating the respective frame number.

For the following description the assumption is made that a frame consists of a gap part GAP, a quasi-static data part SD comprising one symbol and a dynamic data part DD as shown in FIG. 1. Of cource, the order of SD and GAP can be changed. Furtheron, the status information should be valid for the symbols included within the static data part and within the gap part. Both, the gap part and the quasi-static data part comprise a guardinterval.

The quasi-static data part should preferably satisfy the following rules:

The quasi-static data should be in general identical and unique for all services, reference carriers are allowed, data included in the gap should be in general identical and unique for all services, the quasi-static data provides a frequency synchronization possibility that must not necessarily be a phase reference symbol like transmitted in DAB, the frame counter and status information have to be outside the static data part and gap part.

As mentioned above, the repetitive part of the signal is the GAP and SD. On all frequencies of the same service the GAP and the SD are in general the same and unique for this service, i.e. no other service has the same GAP and SD. This might be supported by a specific scrambling of data.

During the time the repetitive part at the current frequency occurs, i.e. the status information for GAP and SD of an earlier frame indicated that the GAP and SD of the current frame has already been transmitted at least once, the receiver can check an alternative frequency. In the present case at least one set of samples, e.g. one spot of several samples, is taken from the alternative frequency as a signal probe and will be correlated with a reference signal within the receiver to gather some information about the alternative frequency. This reference signal might be simply a copy of a previously received GAP and SD in the time domain or can also be a rebuilt signal that is gathered from the information of one or more previously received GAPs and SDs.

On basis of the correlation peak(s) the receiver can decide if the alternative frequency comprises the same service and in addition the time synchronization can be calculated. If two spots of several samples are correlated, additionally a frequency synchronization, i.e. an estimation of $\Delta f$ in-beetween the current frequency or nominal frequency and the alternative frequency can also be calculated.

At the next repetitive part the receiver is then able to switch to the alternative frequency before the SD-symbol occurs on the alternative frequency to use the—known—SD symbol as a phase reference for coherent demodulation, because all carriers are known when switching to the alternative frequency.

Figure 2:
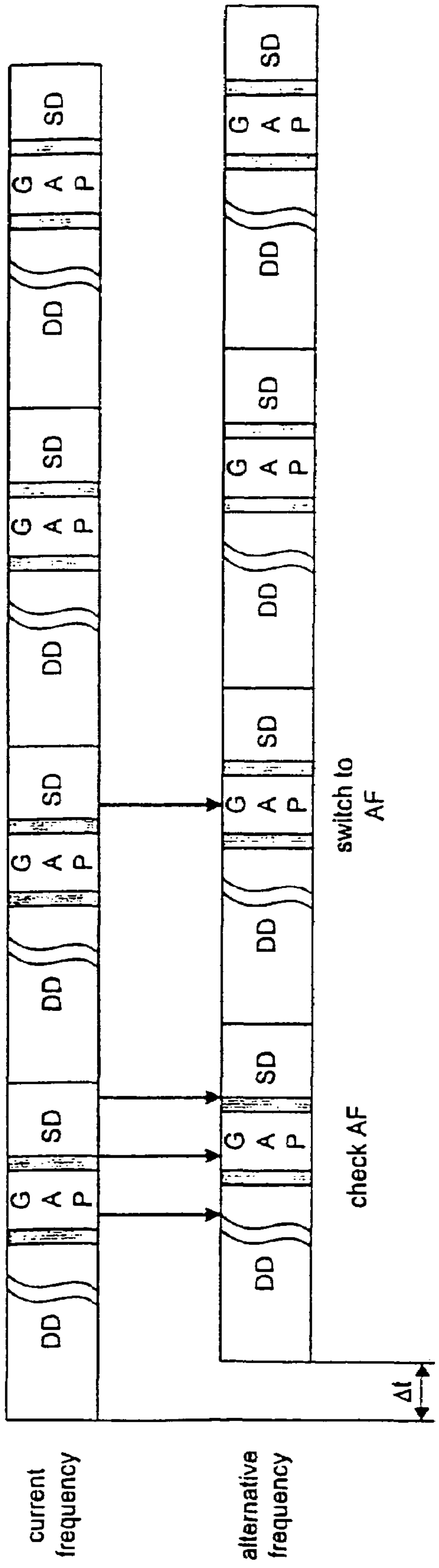

In connection with FIG. 2 the checking of an alternative frequency and the switching thereto is described with a delayed alternative frequency. During the GAP and SD of a frame transmitted on the current frequency three sets of samples of the signal transmitted on the alternative frequency are taken as signal probe. Since two of those sets are taken from the signal carrying the GAP and SD of the corresponding frame transmitted on the alternative frequency the receiver can validly detect if the signal transmitted on the alternative frequency is the same as the currently received signal, and can validly perform a time and frequency synchronization to the alternative frequency. If it is decided within the receiver that the alternative frequency has a better signal quality than the current frequency the receiver is switched to the alternative frequency in the following frame, like it is shown in FIG. 2, before the static data part of the following frame is transmitted on the alternative frequency. Therefore, the known symbol transmitted as static data part on the alternative frequency can serve as a phase reference for the coherent demodulation of the AF-signal, i.e. the signal received on the alternative frequency. Such a fast seamless switching can be performed, since the receiver already has the information for time and frequency synchronization to the alternative frequency and only needs a phase reference.

Figure 3:
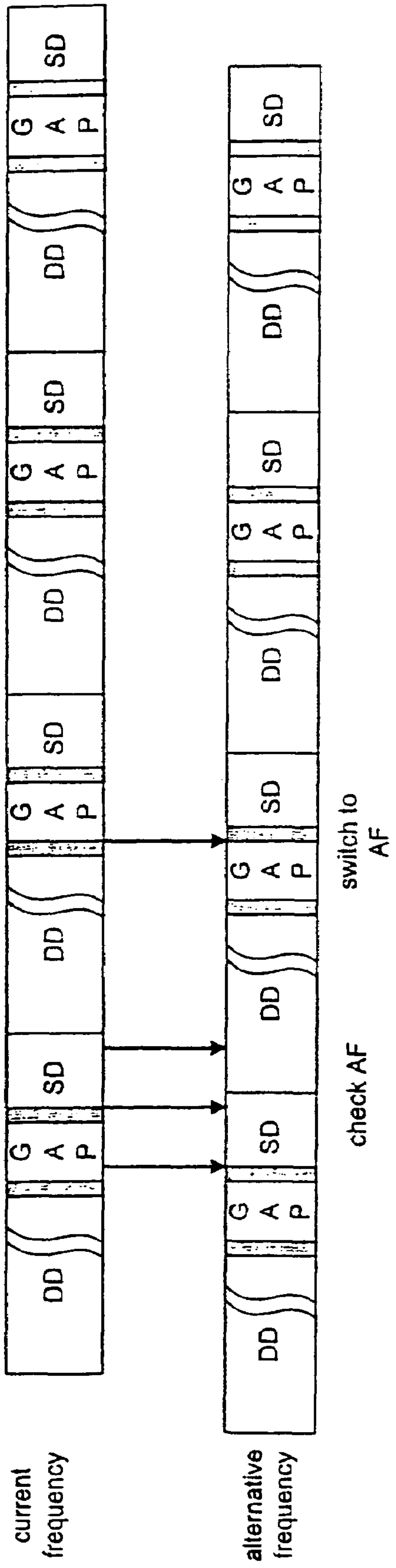

FIG. 3 shows the same scenario in case the alternative frequency transmits a frame earlier than the corresponding frame on the current frequency. Also in this case the switching to the alternative frequency is performed before the SD-symbol occurs on the alternative frequency.

Figure 4:
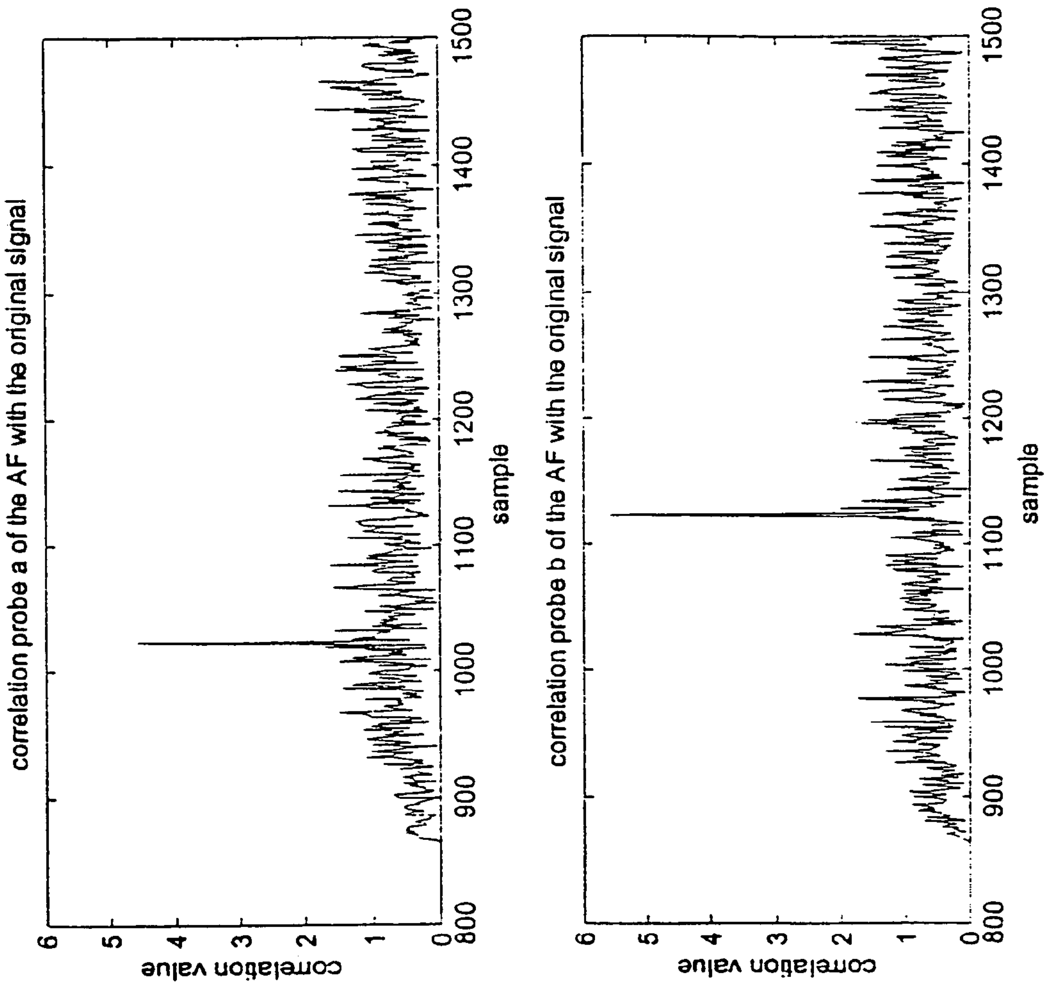

FIG. 4 shows the respective correlation of two sets of samples with the reference signal stored within the receiver. It can clearly be seen that one correlation peak occurs in each of the correlation signals.

In case the AF-signal is the same as the reference signal which is based on the currently received signal, a correlation peak occurs. Since the correlation peak occurs only if the AF-signal is the same as the currently received signal it can be used for the decision if the AF-signal is the same as the currently received signal or not. In the shown case one correlation peak is included within each of the correlation signals, therefore the signals of both sets of samples are included within the reference signal.

To provide a seamless switching from the current frequency to the alternative frequency, a fast synchronization of the receiver to the AF is required. Therefore, information for time and frequency synchronization that was gathered before the switching can now be used as explained above.

The information for the time synchronization is received by an evaluation of the position of the correlation peak or peaks. The position of a correlation peak shows exactly the time difference At between the currently received signal and the AF-signal as it is shown in FIG. 2. Therefore, the receiver is able to perform a quick time synchronization on basis of this time difference.

For calculating the information for the frequency synchronization at least two correlation peaks are required. Additional correlation peaks are determined in time by the first correlation peak and the probe offset. The frequency synchronization information is then gathered by an evaluation of the phase difference between the two correlation peaks. Under the assumption of an ideal channel a phase difference between both correlation peaks can only be caused by a time or frequency error. Due to the high accuracy of the sampling clock of the transmitter and receiver the time error is neglectible. Therefore, the phase difference results basically from a frequency offset. The frequency offset Δf between the currently received signal and the AF-signal can then be calculated from the folowing equation:

$$\varphi_{peak1} - \varphi_{peak2} = \omega_{offset} \cdot t = 2 \cdot \pi \cdot \Delta f \cdot t_{peak1-peak2}$$

$$\Delta f = (\varphi_{peak1} - \varphi_{peak2}) / (2 \cdot \pi \cdot t_{peak1-peak2})$$

wherein $\phi_{peak1}$ and $\phi_{peak2}$ are the phases of the two correlation peaks, and $t_{peak1-peak2}$ is the time difference between both correlation peaks. The maximum frequency offset that can be detected is depending on the time difference $t_{peak1-peak2}$ and is calculated to:

$$\Delta f_{max} = \pm 0.5 \cdot (t_{peak1-peak2})^{-1}$$

The smaller the time difference $t_{peak1-peak2}$ the higher the range of the detecable frequency offset, but the longer the time difference $t_{peak1-peak2}$ the more exact the frequency estimation. Therefore, preferrably three signal probes of the AF-signal are used for the frequency synchronization.

The correlation of the reference signal and the at least one set of samples of the AF-signal is performed in the time domain. As mentioned above, the reference signal can either be the time domain signal of the GAP and SD of an earlier frame carrying the same symbols as the frame within the testing is performed or can be re-calculated in the receiver on basis of the information of one or more previous GAPs and SDs.

Figure 5:
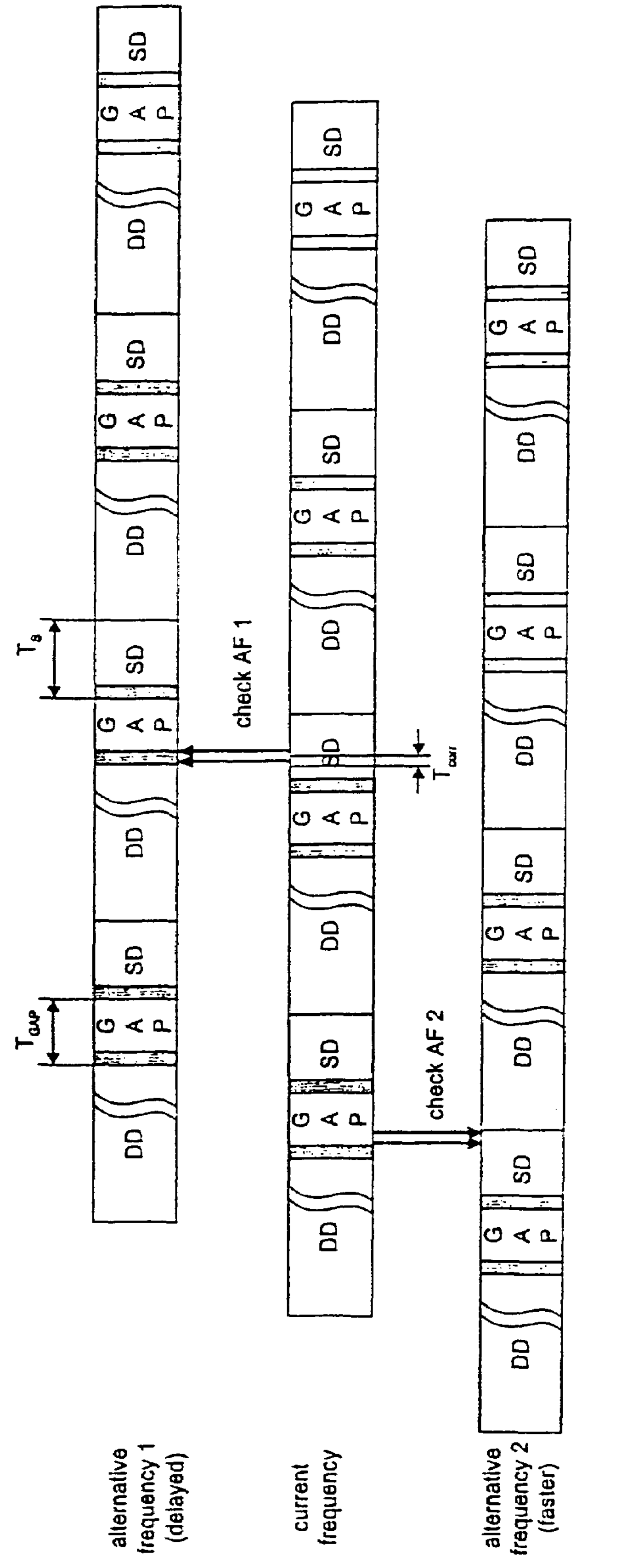

With the help of FIG. 5 in the following the maximum delay of an alternative frequency to the current frequency or of the current frequency to an alternative frequency for the AF-check is illucidated. FIG. 5 shows that the length of the GAP including the guardinterval is $T_{GAP}$, the length of the static data part including the guardinterval is $T_S$ and the time in which one set of samples is transmitted is $T_{corr}$. In the shown example the gap length is constant for all frequencies. Since the checking of an alternative frequency 1 which is delayed in respect to the current frequency and of an alternative frequency 2 which is earlier than the current frequency has to be performed within the GAP and SD transmitted within the frame of the current frequency and the GAP and SD of the same frame transmitted on the respective alternative frequency the maximum delay $T_{Dcheck,max}$ of an AF to the current frequency or of the current frequency to an AF is defined by the following formula:

$$T_{Dcheck,max} = \pm(T_S + T_{GAP} - 2 \cdot T_{corr} - 2 \cdot T_{PLL})$$

where $T_{PLL}$ is the switching time of the PLL from one frequency to another.

Figure 6:
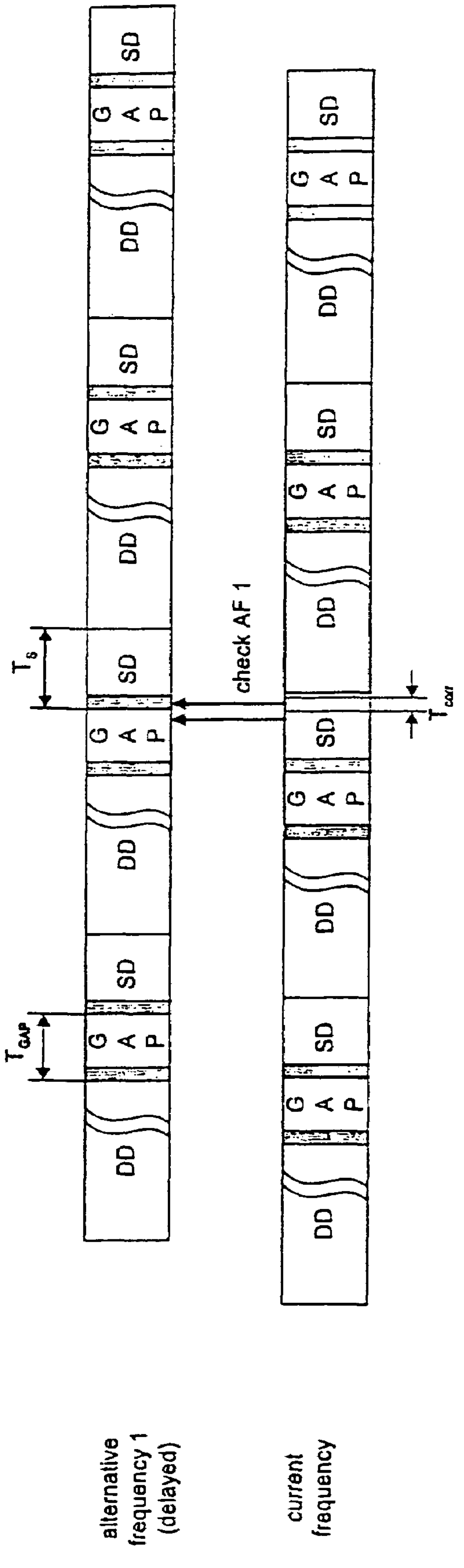

For an easier synchronization the GAP could be a sync-symbol which is equal on all transmissions (all broadcasters and services have the same GAP). Therefore, at least one set of samples has to be from the static data part to validate the same service. As shown in FIG. 6 which directly corresponds to FIG. 5, this causes a shorter maximum delay for the AF-check, i.e.:

$$T_{Dcheck,max} = (T_{GAP} - T_{PLL} - T_{corr})$$

Figure 7:
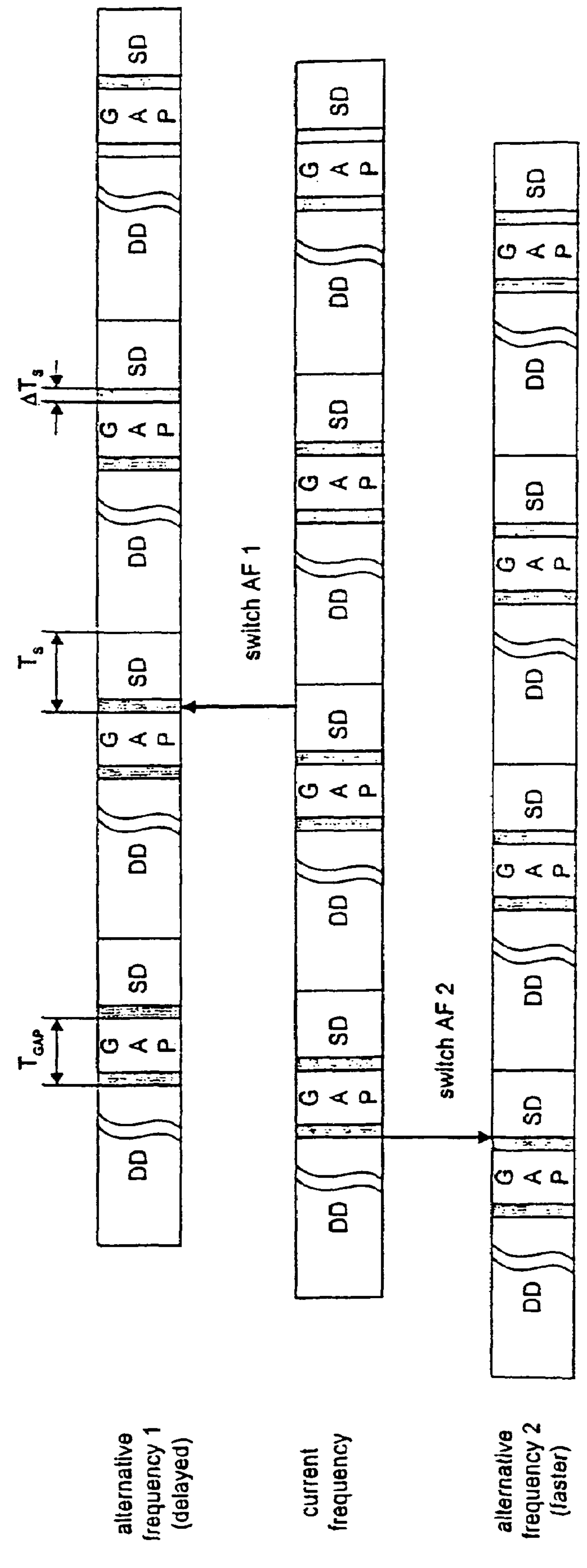

Seamless AF-switching is only possible if a phase reference for the coherent demodulation is available. Preferably the SD can be used as phase reference, because all carriers are known when switching to the alternative frequency. In this case the maximum delay for the switching is shorter than the maximum delay for checking. FIG. 7 directly corresponds to FIGS. 5 and 6 and shows that the switching from the current frequency to an alternative frequency should be performed at least during the guardinterval of the static data part transmitted on the alternative frequency. The maximum delay $T_{Dswitch,max}$ for AF-switching is calculated according to the following formula:

$$T_{Dswitch,max} = T_{GAP} - T_{PLL} + T_S$$

where $\Delta T_S$ is the length of the guard interval of the static data part.

Figure 8A:
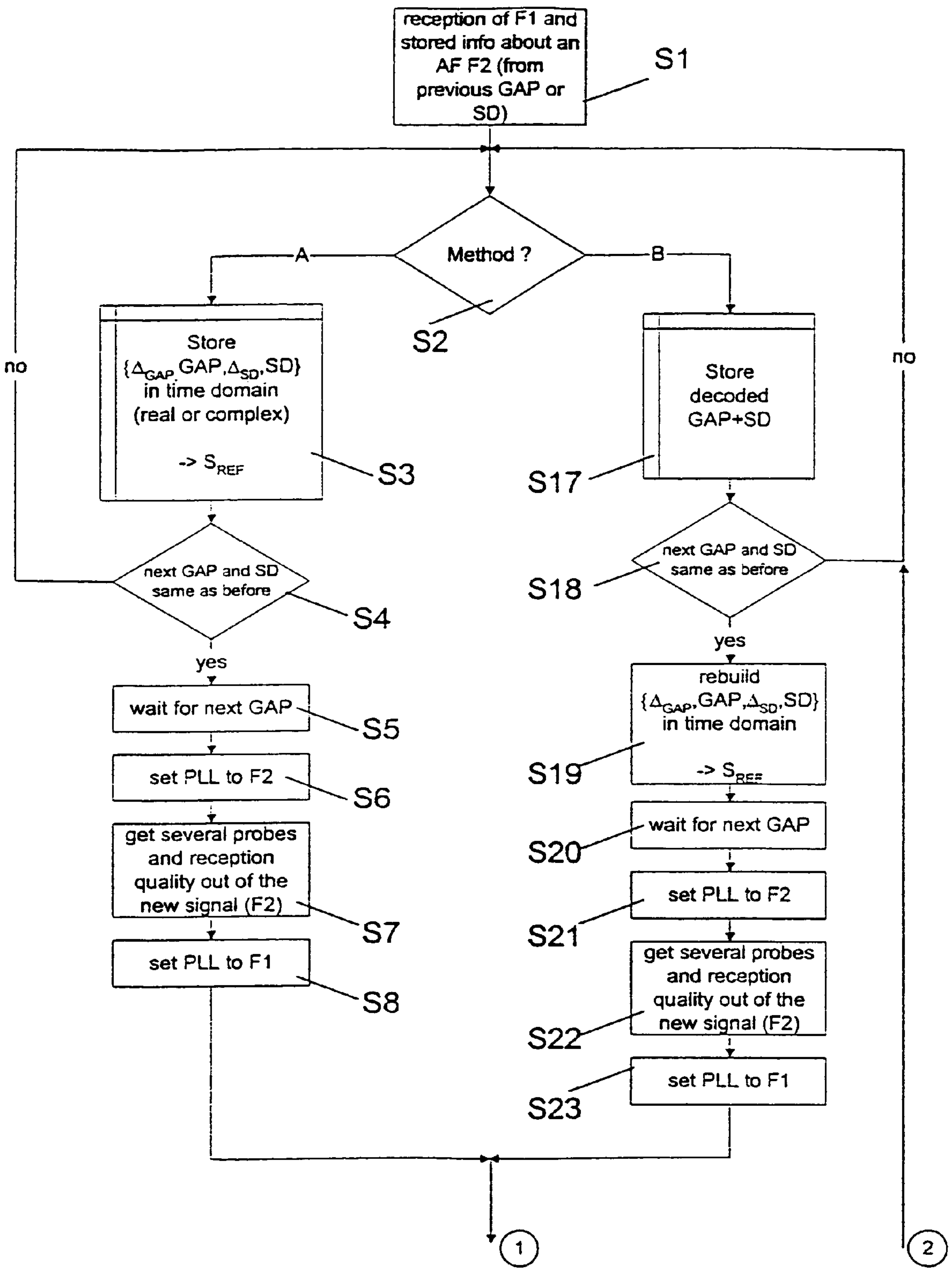
FIG. 8 depicts a flow chart for an alternative frequency switching in a receiver adapted to the method and for the radio transmission signal according to the invention.
Figure 8B:
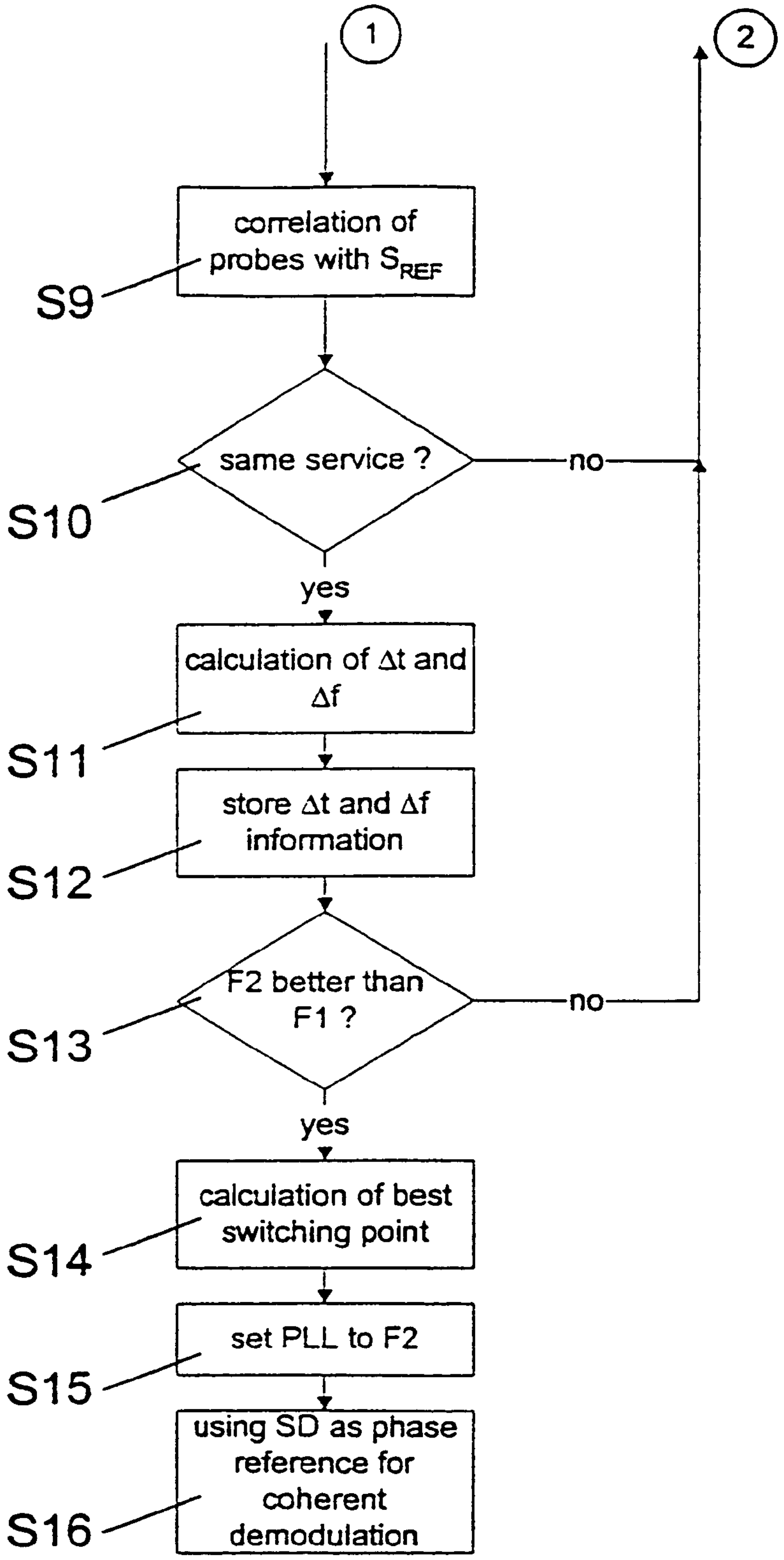

FIG. 8 that consists of FIG. 8*a* and FIG. 8*b* which fit together at connection points (1) and (2) shows a flow chart describing the AF-switching procedure. The receiver is currently tuned to a frequency F1 and has already got the information about the alternative frequency F2, e.g. received in the previous SD and GAP. The flow chart depicts two alternative methods A and B to generate the reference signal $S_{REF}$ $$S_{REF} = \text{time-mux } \{\Delta_{GAP}, \text{GAP}, \Delta_{SD}, SD\}$$

wherein $\Delta_{GAP}$ is the guardinterval of the gap. $\Delta_{SD}$ is the guardinterval of the static data part and time-mux indicates that the following signal parts are transmitted in time-multiplex.

In a first step S1 the signal transmitted on the frequency F1 is received and the information about an alternative frequency F2, e.g. gathered from a previous SD and GAP, is stored. Thereafter, in a step S2 it is decided whether method A or method B is performed to generate the reference signal $S_{REF}$.

In case method A is performed step S3 is carried out in which the received $\{\Delta_{GAP}, \text{GAP}, \Delta_{SD}, \text{SD}\}$ is stored as reference signal $S_{REF}$ in the time domain as real or complex signal. Thereafter, it is checked in step S4 whether the next transmitted SD and GAP is the same as before on basis of the reference signal $S_{REF}$.

The decision whether the next SD and GAP is checked in step S4 depends on the indicator included in the dynamic data part, since this indicator indicates which of the following frames transmits the same SD and GAP as the frame which served as a basis for generation of the reference signal $S_{REF}$.

If the next GAP and SD is not the same as the one on basis of which the reference signal SREF is generated step S2 is again performed. If, on the other hand, it is decided that the next GAP and SD corresponds to the GAP and SD on basis of which the reference signal $S_{REF}$ is generated the receiver waits in step S5 for the next GAP, since this is transmitted before the SD in this embodiment of the present invention. Thereafter, when the beginning of the next GAP is received, the phase locked loop (PLL) of the receiver is set to the frequency F2 in step S6 and a signal probe and the reception quality is gained out of the new signal F2 in step S7 before the phase locked loop is again set to the frequency F1 in step S8.

During the follwing reception of the signal transmitted on the frequency F1 the receiver performs a correlation of the sets of samples, i.e. the probe, with the reference signal $S_{REF}$ in step S9 to decide whether the reference signal and the probe belong to the same service or not in step S10. If this is not the case step S2 is again performed, otherwise, i.e. if the reference signal and the probe belong to the same service, the information for time and frequency synchronization to the new frequency F2, namely the time and the frequency deviations $\Delta t$ and $\Delta f$ is calculated in step S11 and stored in step S12. In step S13 it is decided whether the frequency F2 has a better signal quality than the frequency F1. If this is not the case step S2 is again performed. If this is the case the best switching point is calculated in step S14 before the phase locked loop of the receiver is set to the frequency F2 at this best switching point in step 315 and the quasi-static data part SD transmitted on the frequency F2 is used as phase reference for the coherent demodulation in step S16.

If it is decided in step S2 that the method B should be performed instead of method A steps S17 to S23 are carried out instead of steps S3 to S8.

Therefore, in step S17 the decoded GAP and SD is stored before it is decided in step S18 whether the next GAP and SD corresponds to the stored ones in step S18. This step S18 directly corresponds to step S4 and therefore depending on the indicator within the dynamic data part also another corresponding GAP and SD could be checked. If no corresponding GAP and SD exists again step S2 is performed (the same situation as in connection with step S4). If, on the other hand, the GAP and SD which has been stored in step S17 will be transmitted again then $\{\Delta_{GAP}$, GAP, $\Delta_{SD}$, SD$\}$ will be rebuild in the time domain and stored as reference signal SREF in step S19. Thereafter, the receiver waits for the next GAP in step S20 (corresponding to step S5), sets then the PLL to the frequency F2 in step S21 (corresponding to step S6), gets several sets of samples and the reception quality out of the new signal received on the frequency F2 in step S22 (corresponding to step S7) and sets the PLL to the frequency F1 in step S23 (corresponding to step S8) before again proceeding with step S9.

Figure 9:
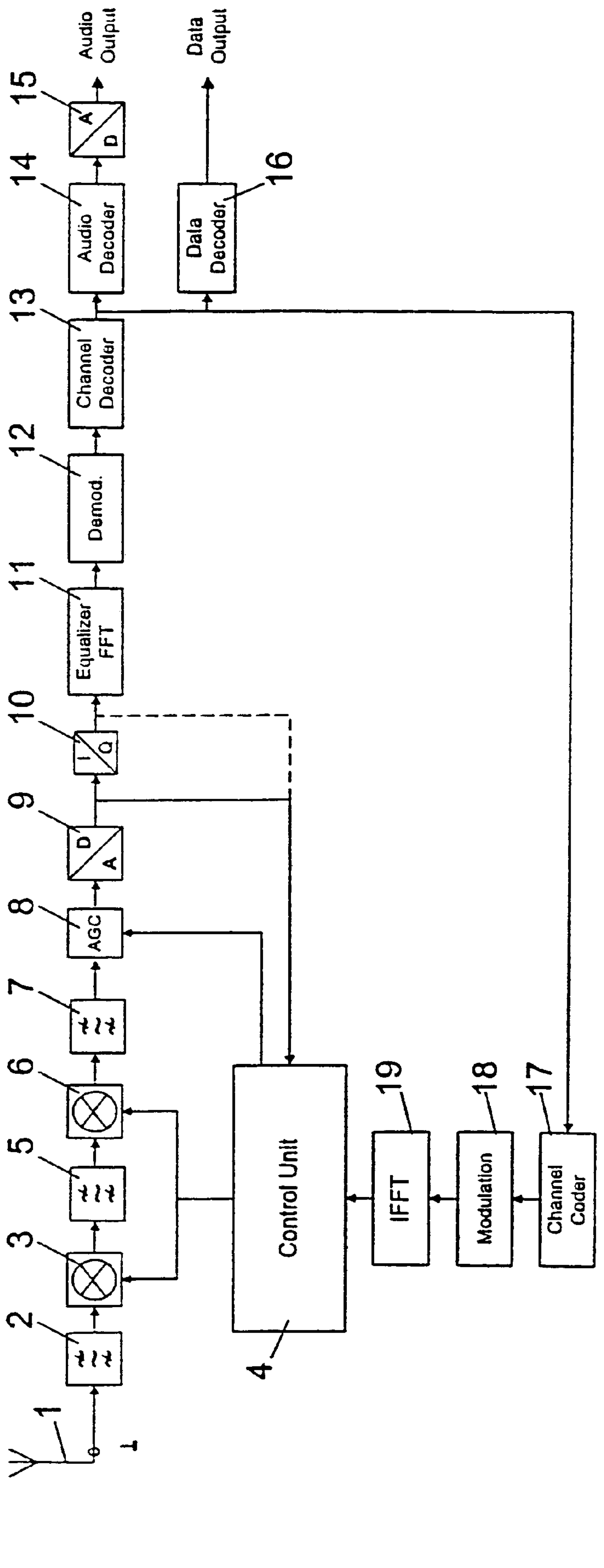
FIG. 9 is a block diagram of a receiver with features according to the invention.

The typical hardware structure of a digital receiver adapted to perform the method according to the invention is shown in FIG. 9. The transmission signal, in particular a Digital Radio Mondial signal, is received by an antenna 1 and after amplification passes a selective pre-stage 2 and is supplied to a first input of a mixer 3 that receives as a second input thereof a frequency control signal supplied by a control unit 4. Following an IF filter stage 5, the resulting signal is supplied to one input of a mixer 6 supplied at its other input thereof a frequency control signal from the control unit 4. The resulting signal is again filtered in IF filter 7 before its level is adjusted in an automatic gain control (AGC) circuit 8 and AD/conversion in an A/D-converter 9. The automatic gain control circuit 8 also receives a control signal from the control unit 4. The digital signal supplied from the A/D-converter 9 undergoes an IQ-generation in an IQ-generator 10 before a FFT is performed in an equalizer 11 and the resulting signal is demodulated by a demodulator 12 and the channels get decoded by a channel decoder 13. The decoded channels are then input to an audio decoder 14 which outputs a digital audio signal that gets converted by a D/A-converter 15 and to a data decoder 16 which outputs digital data. The control unit 4 further receives the amplitude corrected and digitized output signal of the A/D-converter 9 either direct or as IQ-signals from the IQ-generator 10. To be able to rebuild the reference signal $S_{REF}$ the output signal from the channel decoder 13 is also fed through a channel coder 17, a modulator 18 and an IFFT circuit 19 which performs an Inverse Fast Fourier Transformation before being input to the control unit 4.

If a buffer for the received signal is additionally provided within the receiver a switching without loosing any information, i.e. a seamless switching, is possible in any situation and not restricted to the maximum delay times calculated above.

If the quasi-static data has a higher volume than to be transmitted within one frame the GAPs and SDs of several frames can be used for the transmission. In this case the indicator within the dynamic data part indicates the transmission cycles of the same data or the next frame in which the same data is again transmitted. This could be done in relation to the frame counter. Also, in this case the receiver has to store all possible GAPs and/or SDs.

The gap length can preferably be variable by decreasing or increasing the carriers in the gap. As preferably the AF-list will be transmitted in the gap which includes the frequency, the transmitter ID and geographical data, this information can be used for hyperbolic navigation if at least three alternative frequencies can be received in a present receiver position.

Since the gap and/or quasi-static data should be in general identical and unique for all services the data included therein can be scrambled in order to get uniqueness, if necessary.

Figure 10:
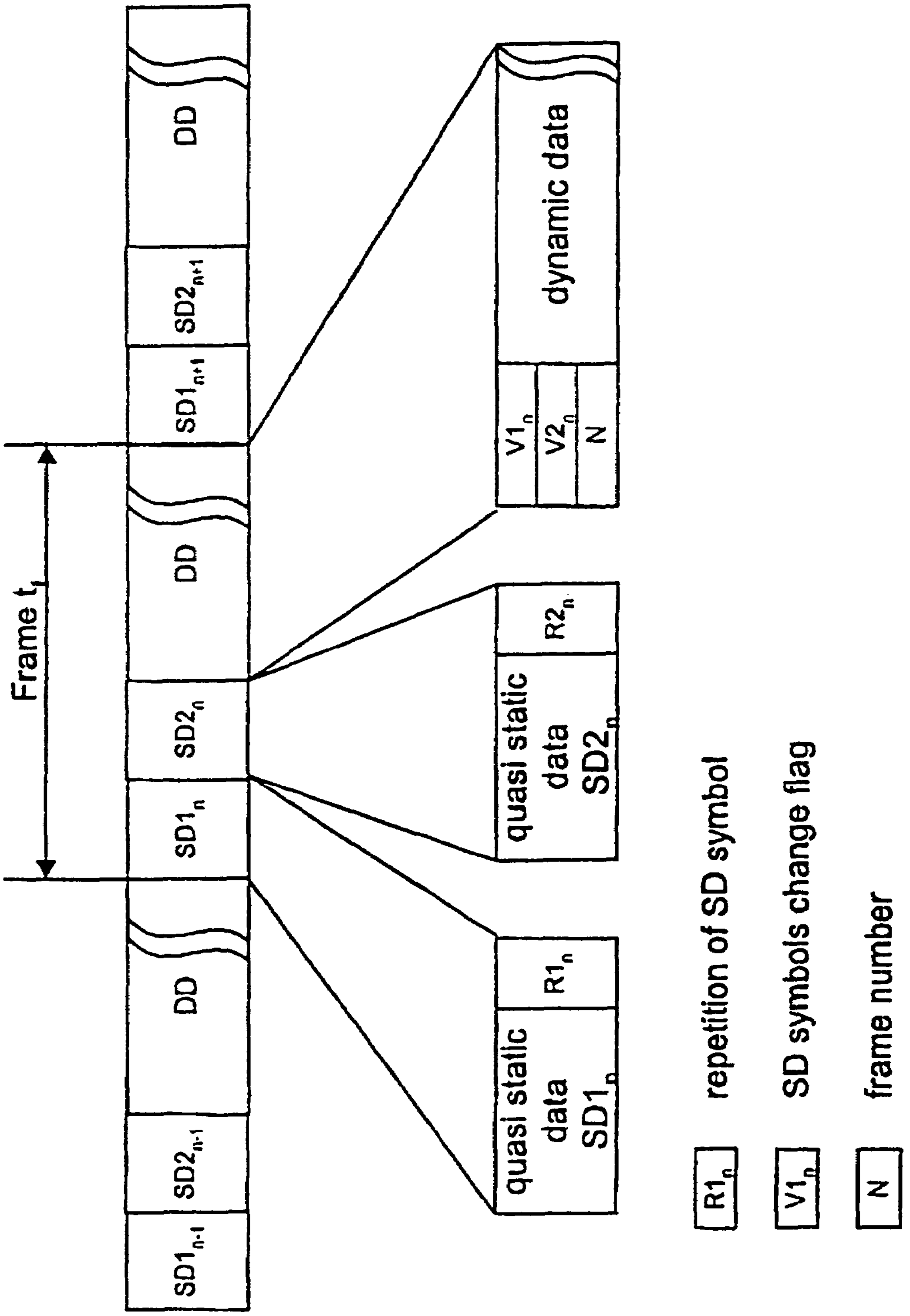
FIG. 10 depicts the principle frame structure and partly the preferred contents of information units according to a second preferred embodiment of the invention.
Figure 11:
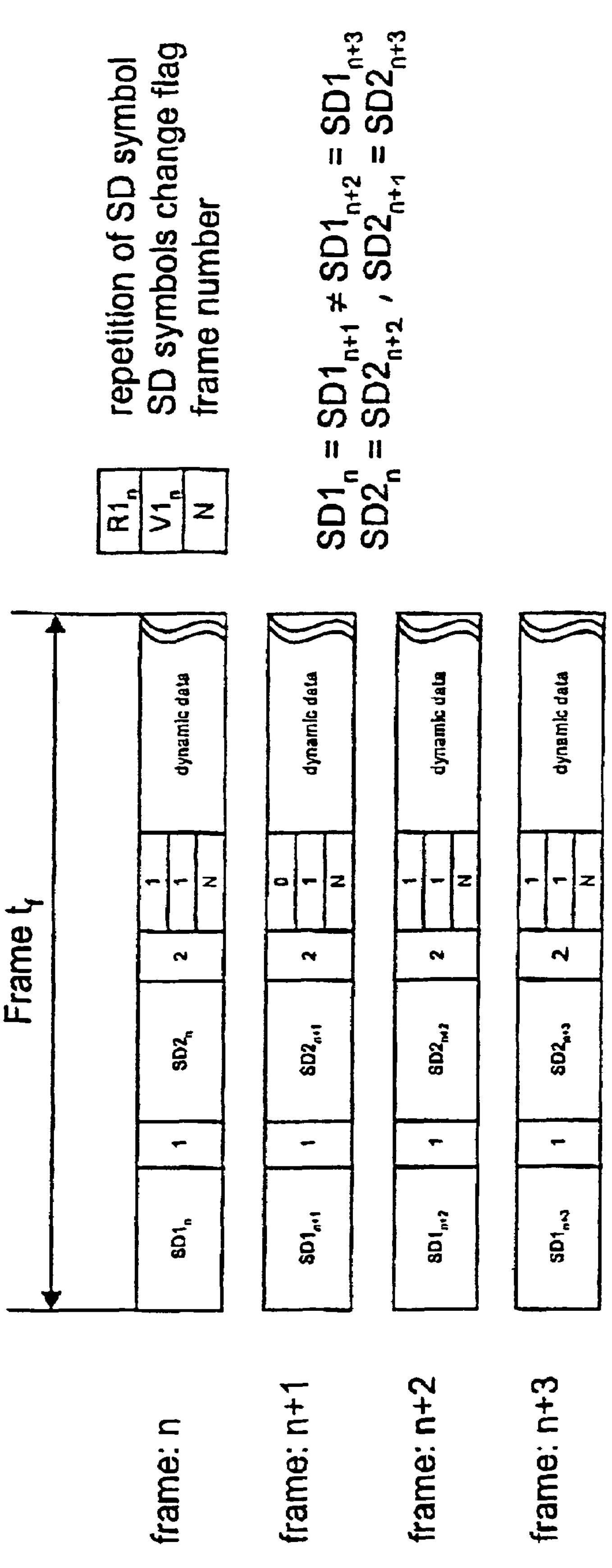
FIG. 11 shows an example of the frame structure according to the second preferred embodiment of the invention.

FIGS. 10 and 11 show a second preferred embodiment according to the present invention according to which the status information included in the respective dynamic parts of the dynamic data-channel does not directly show the frame number of the following frame in which the quasi-static data part and if applicable the gap part comprise the identical symbols as the quasi-static data part and if applicable the gap part of the frame comprising the status information as in the above described first preferred embodiment according to the present invention, but indirectly shows said information.

According to this second embodiment of the present invention the coding efficiency for the dynamic part of the dynamic data-channel is enhanced by not including a frame number as status information, but only an information whether such a frame number or any other frame repetition index which is included within the quasi-static data part and if applicable within the gap part is valid or not, i.e. a validation for such an information.

In the following description of an example of the second embodiment according to the present invention the gap part GAP is now described as SD1 symbol and the previous called quasi-static data part SD is now described as SD2 symbol, since according to this example of the second embodiment quasi-static data is transmitted in both parts which respectively comprise only one symbol. Of course, the second embodiment according to the present invention is not limited to the use of just one symbol for a respective part and also not to the transmission of quasi-static data in both parts as well as not to the usage of the GAP part at all.

According to the described example of the second embodiment according to the present invention a respective repetition rate field is implemented within each of the SD1 and SD2 symbols. The repetition rate field shows the repetition rate of a respective one of the SD1 and SD2 symbols in which it is included, e.g. 3 if the respective quasi-static data symbol is repeated every three frames. In the dynamic data part DD of the signal are two valid fields implemented as status information. One of the valid fields indicates the validity of the repetition rate of the SD1 symbol and the other valid field indicates the validity of the repetetition rate of the SD2 symbol, i.e. as respective valid field indicates whether the respective quasi-static data symbol will really be repeated as indicated within said quasi-static data symbol or will not be repeated. The latter case corresponds to 0 as status information in the first preferred embodiment according to the present invention.

FIG. 10 shows three consecutive transmitted frames each having a length of $t_f$ and each comprising first a quasi-static SD1 symbol followed by a quasi-static SD2 symbol which is followed by a dynamic data part DD. To distinguish the quasi-static data symbols SD1 and SD2 of the respective frames these symbols are shown with a serially numbered index, namely n−1 for the first (left) shown frame, n for the second (middle) shown frame and n+1 for the third (right) shown frame. As exemplary shown in FIG. 10 for the frame having the index n for the quasi-static data symbols each of the quasi-static data symbols comprise quasi-static data and a repetition rate field indicating the repetition rate of the respective symbol. The repetition rate field for the $SD1_n$ symbol has the value $R1_n$ and the repetition rate field for the $SD2_n$ symbol has the value $R2_n$. Furtheron, it is shown that the dynamic data part DD comprises dynamic data and to two valid fields indicating the validity for the respective repetition rates of the quasi-static data symbols. In FIG. 10 the dynamic data part DD comprises a first valid field having a value $V1_n$ indicating the validity of the $SD1_n$ symbol and a second valid field having a value $V2_n$ indicating the validity of the $SD2_n$ symbol. Optionally, the dynamic data part DD can comprise a field for the frame number N.

As mentioned above, a respective value R of a respective repetition rate field shows in which future frame the current quasi-static data symbol will be repeated, namely for which future frame the following equations are valid:

$$SD1_{n+R1_n}=SD1_n$$

$$SD2_{n+R2_n}=SD2_n$$

A respective valid field shows if the repetition rate of the respective quasi-static data symbol is valid for the frame $N=n+R1_n$, $N=n+R2_n$ or if the respective quasi-static data symbol will be changed in the respective indicated frame, as shown by the following equasions:

$$SD1_n=SD1_{n+R1_n}\rightarrow V1_n=1$$

$$SD1_n\neq SD1_{n+R1_n}\rightarrow V1_n=0$$

$$SD2_n=SD2_{n+R2_n}\rightarrow V2_n=1$$

$$SD2_n\neq SD2_{n+R2_n}\rightarrow V2_n=0$$

A receiver can then quickly and reliably perform the AF-check if both symbols SD1 and SD2 are known for the frame N and the corresponding validity values $V_1$ and $V_2$ are set to 1. The repetition rates $R_1$ and $R_2$ can be independent, but the receiver has to manage a look ahead table in which the information about the respective quasi-static data symbols for a future frame is stored. The length of this table depends on the maximum allowed repetition rate, as it is indicated in the following equation:

$$\text{Length (look\_ahead\_table)}=\max(R1_n, R2_n)$$

Of course, it is also possible to apply this scheme to a transmission system with only one repeatedly changing SD symbol, e.g. while keeping the other SD symbol fixed (as e.g. described in connection with the first embodiment of the present invention). In this case only one validity value $V_n$ is needed for the repeatedly changing SD symbol, i.e. to indicate whether the repetition rate $R_n$ included within the quasi-static data part is valid or not. Furtheron, the scheme can also be applied to a system with only one quasi-static data part e.g. consisting of one SD symbol at all. In this case also only one validity value $V_n$ in the dynamic data part DD is needed.

The frame number can also be generated in the receiver as a relative distance between equal SD symbols. Therefore, it is not mandatory to transmit the frame number within the dynamic data part DD.

FIG. 11 shows an example of this described second embodiment according to the present invention in which four consecutive frames n to n+3 are shown and in which the SD1 symbol is changed between the frame N=n+1 and the frame N=n+2. It is shown that the validity value $V1_{n+1}$ is set to 0 to signal that the SD1 symbol which is repeated every frame, i.e. $R1_n \ldots R_{n+3}=1$, is changed in the frame $N=(n+1)+R1_{n+1}$. The validity value V2 is 1 in all shown frames, since the SD2 symbol having a repetition rate $R2_n \ldots R2_{n+3}=2$, is not changed.

Therefore, in the shown example the following equations are satisfied:

$$SD1_n=SD1_{n+1}$$

$$SD1_{n+2}=SD1_{n+3}$$

$$SD2_{n=SD}2_{n+2}$$

$$SD2_{n+1=SD}2_{n+3}$$

Apart from the different structure of the status information within the dynamic data part DD, i.e. instead of direct indication of the absolute or relative frame number in which the quasi-static data will be repeated using an indirect indication to have a higher coding efficiency within the dynamic data part by validating a repetition rate indicated within the quasi-static data, and therewith the different gathering method for the status information, the processing to perform the seamless AF switching according to the second embodiment according to the present invention is equal to the processing described in connection with the first preferred embodiment according to the present invention.

The invention claimed is:

1. A method for receiving a radio transmission signal, comprising:

receiving a signal transmitted on a first frequency, wherein the signal consists of consecutive frames that comprise a dynamic data part and a quasi-static data part, said dynamic data part of at least one of said frames further includes an indicator showing in which one of said consecutive frames the quasi-static data part of the at least one of said frames will be repeated; and receiving at least one set of samples from a signal transmitted on at least one second frequency during a time period during which said indicator assures that it is secure and that only data that has been transmitted at least once is transmitted as signal on the first frequency.

2. The method according to claim 1, further comprising:

performing a correlation of a reference signal stored within the receiver with one of said at least one set of samples from the respective signal transmitted on said at least one second frequency to check whether the signal transmitted on the respective both frequencies is the same signal on basis of the correlation signal.

3. The method according to claim 2, wherein a respective time difference (Δt) between the signal transmitted on the first and respective second frequencies is calculated on basis of the correlation signal.

4. The method according to claim 1, further comprising:

performing a respective correlation of a reference signal stored within the receiver with each of a least two sets of said at least one set of samples from the respective signal transmitted on said at least one second frequency to calculate the frequency offset (Δf) of the respective second frequency in respect to the first frequency on basis of the correlation signals.

5. The method according to claim 2, wherein said reference signal is a copy of the signal received on the first frequency for which the indicator shows in which following frame it will be repeated.

6. The method according to claim 2, wherein said reference signal is a signal which is rebuild in the time domain on basis of the information carried by the signal received on the first frequency for which the indicator shows in which following frame it will be repeated.

7. The method according to claim 1, further comprising:

switch to one of said at least one second frequency at a point of time at which it is secure that only data that has been transmitted once will be received on the second frequency so that a symbol of the newly received signal comprising data already known to the receiver can be used as phase reference for the demodulation of the signal transmitted on the second frequency.

8. The method according to claim 1, wherein a switching to one of said at least one second frequency is performed in case said one of said at least one second frequency has the best reception quality of the signals received on the first and respective second frequencies.

9. A receiver adapted to switch from a first currently tuned frequency to a second alternative frequency, comprising:

a memory configured to store a part of a received signal of the first frequency, or a signal rebuild on basis of the information of a part of the received signal of the first frequency with a rebuild section as reference signal, wherein said rebuild section includes a channel coder configured to receive the information of a received signal, a modulator configured to receive the output signal of the channel coder, an IFFT circuit configured to receive the output signal of the modulator to rebuild the transmission signal of the modulated information of the received signal; and a correlator configured to perform a correlation of the reference signal with at least one probe of a signal received on said second frequency to decide whether the same service is transmitted on both frequencies or to calculate a time offset (Δt) in-between the signals transmitted on both frequencies, or to calculate a frequency offset (Δf) in-between both frequencies.

10. The receiver according to claim 9, wherein the memory is located within a control unit.

11. The receiver according to claim 9, wherein said receiver is configured to receive analog or digital short-, medium- or longwave signals, DAB, DVB-T, ADR or FM signals.

12. A receiver adapted to switch from a first currently tuned frequency to a second alternative frequency, comprising:

a memory configured to store a part of a received signal of the first frequency, or a signal rebuild on basis of the information of a part of the received signal of the first frequency with a rebuild section as reference signal; and a correlator configured to perform a correlation of the reference signal with at least one probe of a signal received on said second frequency to decide whether the same service is transmitted on both frequencies or to calculate a time offset (Δt) in-between the signals transmitted on both frequencies, or to calculate a frequency offset (Δf) in-between both frequencies;

said signals consisting of signal frames that comprise a dynamic data part (DD) and a quasi-static data part (SD; SD1, SD2), wherein the dynamic data part (DD) of a respective frame contains an indicator (Status; $V\mathbf{1}_n$, $V\mathbf{2}_n$) showing in which following frame the quasi-static data part (SD; SD1, SD2) of this respective frame will be repeated, characterized by receiving at least one set of samples from a respective signal transmitted on at least one second frequency during a time period during which said indicator assures that it is secure that only data that has been transmitted at least once is transmitted as signal on said first frequency.

13. The receiver according to claim 12, wherein said receiver is configured to receive analog or digital short-, medium- or longwave signals, DAB, DVB-T, ADR or FM signals.

14. A method of receiving a radio transmission signal comprising:

receiving a radio signal having signal frames that comprise a dynamic data part and a quasi-static data part, wherein the dynamic data part of a respective frame contains an indicator showing in which following frame the quasi-static data part of said respective frame will be repeated; and recovering information transmitted by said radio signal as a function of said indicator.

15. A n apparatus for receiving a radio transmission signal, comprising:

a receiver for receiving a radio signal having signal frames that comprise a dynamic data part and a quasi-static data part, wherein the dynamic data part of a respective frame contains an indicator showing in which following frame the quasi-static data part of said respective frame will be repeated; and a decoder for recovering information transmitted by said radio signal as a function of said indicator.

16. A receiver for receiving a radio transmission signal, comprising:

a control unit configured to control the receiver to receive a signal transmitted on a first frequency, wherein the signal consists of consecutive frames that comprise a dynamic data part and a quasi-static data part, said dynamic data part of at least one of said frames further includes an indicator showing in which one of said consecutive frames the quasi-static data part of the at least one of said frames will be repeated; and said control unit is further configured to control the receiver to receive at least one set of samples from a signal transmitted on at least one second frequency during a time period during which said indicator assures that it is secure that only data that has been transmitted at least once is transmitted as signal on the first frequency.

* * * * *